3,184,417
METHOD OF PREPARING A COPPER MODIFIED NICKEL CATALYST COMPOSITION

Eugene V. Hort, Westfield, N.J., assignor to General Aniline & Film Corporation, New York, N.Y., a corporation of Delaware
No Drawing. Filed Dec. 29, 1960, Ser. No. 79,174
4 Claims. (Cl. 252—474)

This invention relates to the production of a modified nickel hydrogenation catalyst and more particularly to a process for producing an improved copper-modified nickel hydrogenation catalyst.

It has been previously proposed to produce a copper-modified nickel catalyst by treating a nickel catalyst with an aqueous copper salt solution. In this method, since nickel is higher than copper in the electromotive series, nickel from the catalyst goes into solution and the copper in the solution plates upon the catalyst surface. This action proceeds irrespective of whether or not the mixture of nickel catalyst and aqueous copper salt solution is simultaneously hydrogenated. It has been found however that the catalyst prepared in this manner is subject to a number of disadvantages. It is extremely pyrophoric, often igniting even when damp. This catalyst also has decreased activity in hydrogenation processes, particularly as more copper is used, since the copper dissolves and thus removes some of the functionally catalytic nickel in the nickel catalyst being modified.

It is an object of this invention to provide an improved copper-modified nickel hydrogenation catalyst which will not be subject to one or more of the above disadvantages. Another object of this invention is the provision of an improved process for preparing such a catalyst. Other objects and advantages will appear as the description proceeds.

The attainment of the above objects is made possible by my invention which broadly comprises mixing a water soluble copper salt with a water soluble inorganic alkaline hydroxide in an aqueous solution at a pH high enough to insolubilize the copper salt in the form of suspended copper hydroxide, admixing the copper hydroxide suspension with a finely divided nickel catalyst, and treating the resulting admixture with gaseous hydrogen to deposit metallic copper on the nickel catalyst. It has been found that the catalyst produced by the process of this invention is surprisingly less pyrophoric and has a relatively increased activity for catalyzing hydrogenating processes. When employed to catalyze the hydrogenation of acetylenic compounds such as 1,4-butynediol, the catalysts produced by this invention seem to inhibit and suppress undesirable side reactions. In addition, there is a desirable increase in the rate of hydrogenation of carbonyl-containing impurities arising from such side reactions. A concomitant advantage resides in the increased catalyst life since these catalysts can be reused many times without additional increments of copper.

The nickel catalysts employed in the process of this invention are well known, being in the form of finely divided nickel particles either unsupported or supported as for example by the deposition on an inert carrier or support of known type, such as carbon, silica, alumina, and the like. A Raney-type nickel catalyst (such catalysts are described in U.S. Patent No. 1,638,190) is preferred as yielding optimum results. This type of catalyst is readily prepared by treating an aluminum-nickel alloy with caustic soda to dissolve out the aluminum and leave the nickel in a highly divided and particularly effective form.

Any water soluble copper salt may be employed in carrying out my process. Copper salts of strong and weak acids are generally operative, such as copper sulfate, chloride, nitrate, acetate, formate, carbonate, cyanide, and the like. Sufficient copper salt should preferably be employed in this process to permit deposition on the particles of the finely divided nickel catalyst being treated of about 3 to 35% of copper in metallic form. Below this amount, less side reactions in hydrogenation processes are inhibited and above this amount the catalyst activity gradually falls off.

As the water soluble inorganic alkaline hydroxide, sodium hydroxide or potassium hydroxide are preferred although any other alkali metal or alkaline earth metal hydroxide may be employed such as the hydroxides of lithium, magnesium, barium, and strontium and the like. A sufficient amount of hydroxide is employed to adjust the medium to a sufficiently alkaline pH so that substantially no copper is left in solution. A pH of more than 7 and preferably more than 8, up to about 11 or 12, is generally required.

The insolubilization of the copper salt in the form of suspended copper hydroxide is preferably carried out by adding a sufficient amount of the alkaline hydroxide, or preferably an aqueous solution thereof, to an aqueous solution of the copper salt whereby the copper is insolubilized as suspended copper hydroxide. Alternatively, the copper salt, or preferably an aqueous solution thereof, is added directly to an aqueous alkaline solution of the alkaline hydroxide. There is thus produced a suspension or slurry of flocculent hydrous copper oxide which is readily susceptible to hydrogenation whereby the copper hydroxide is reduced and metallic copper is deposited on the nickel catalyst in the admixture.

The treatment with gaseous hydrogen is not critical and may be carried out in any manner and under any desired conditions of temperature, pressure and the like, as for example, from room temperature to 200° C. or more and pressures of 0 to 200 atmospheres or more, desirably with agitation. It is often preferred, for economic reasons, to avoid the necessity of previously preparing the catalysts of this invention by combining the present process with the catalytic hydrogenation process in which the catalyst is used. This is readily accomplished by admixing the compound to be hydrogenated with the above described copper salt solution or copper hydroxide suspension, i.e. at any stage prior to the hydrogenating step. In this manner, the desired copper-modified nickel catalyst will be produced in situ during the initial stages of the hydrogenation of the said compound.

The catalysts of this invention, whether produced by a separate preliminary treatment of the nickel catalyst or as produced in situ during hydrogenation of a hydrogenatable compound, may be employed advantageously in the catalytic hydrogenation of aliphatic and aromatic nitro compounds to the corresponding amines, ketones and aldehydes to the corresponding alcohols, ethylenic compounds to the corresponding saturated compounds, acetylenic compounds to the corresponding ethylenic compounds or saturated compounds, and the like. The invention is particularly suitable for use in the hydrogenation of acetylenic compounds by the processes disclosed and claimed in my U.S. Patents 2,950,236 and 2,953,605 and in the copending application of Hort and Graham, Serial No. 783,717, filed December 30, 1958, now U.S. Patent No. 2,967,893. The resulting 1,4-butanediol has a multitude of known uses, including reaction with dibasic acids to form polyester resins, reaction with diisocyanates to form polyurethane resins, as a lubricant, moistener, solvent, etc.

When produced as a separate preliminary step, the described copper-modified nickel catalyst is preferably maintained in the form of an aqueous slurry as directly produced, or in the form of an aqueous paste as produced for example by filtering the slurry, to avoid contact with air since the catalyst tends to be pyrophoric, though substantially less so than the copper-modified nickel catalysts produced by the above mentioned prior arts methods.

The nature of the physical structure of the catalysts of this invention is not clearly understood, the copper treated opaque grey-black particles produced appearing under the microscope to resemble the untreated nickel particles. It is presumed that the instant products are particles of nickel continuously or discontinuously covered with a porous coating of copper and/or in contact with particles of copper, in either case, the copper being in some instances admixed with minor amounts of copper oxides.

The following examples are only illustrative of this invention and are not to be regarded as limitative. All parts and proportions referred to herein and in the appended claims are by weight unless otherwise indicated.

Example 1

12 g. of copper acetate were dissolved in 500 cc. water and the solution adjusted to pH 8.5 with sodium hydroxide. To this slurry was added 48 g. of a 50% aqueous Raney nickel paste. The material was charged to a 1 liter stirred autoclave and hydrogenated at 50° C. and 100 p.s.i.g. (pounds per square gauge) hydrogen pressure. The resulting slurry of copper-modified nickel catalyst could be used in a hydrogenation process without change or after filtering to a gray press cake.

Example 2

To 1450 g. (6.0 moles) of 35.4% 1,4-butynediol solution was added 12 g. of copper acetate and the solution was adjusted to pH 8.5 with sodium hydroxide. To this slurry was added 48 g. of a 50% aqueous Raney nickel paste. The material was charged into a 1 gallon stirred autoclave and hydrogenated to completion at 40° C. and 75 p.s.i.g. This required 5¼ hours. It was then held at 100° C. and 75 p.s.i.g. for 3 hours, cooled and discharged.

Filtered from the catalyst, and distilled, a 93% yield of 1,4-butanediol, solidification point 19.4° C., was obtained.

On reuse of this catalyst similar rates, yields, and product quality were obtained.

This invention has been disclosed with respect to certain preferred embodiments, and various modifications and variations thereof will become obvious to persons skilled in the art. It is to be understood that such modifications and variations are to be included within the spirit and scope of this invention.

I claim:

1. A process for preparing a copper-modified nickel hydrogenation catalyst comprising mixing an aqueous solution of a copper salt with an amount of a water soluble inorganic alkaline hydroxide selected from the group consisting of alkali metal and alkaline earth metal hydroxides sufficient to yield a pH of more than 7 and insolubilize the copper salt in the form of suspended copper hydroxide, admixing the resulting aqueous suspension of copper hydroxide with a finely divided nickel catalyst, and treating the resulting admixture with gaseous hydrogen to deposit metallic copper on the nickel catalyst, the amount of said copper salt employed being sufficient to deposit on said nickel catalyst about 3 to 35% of metallic copper.

2. A process as defined in claim 1 wherein said copper salt is copper acetate.

3. A process as defined in claim 1 wherein said water soluble inorganic alkaline hydroxide is sodium hydroxide.

4. A process as defined in claim 1 wherein said nickel catalyst is a Raney-type nickel catalyst.

References Cited by the Examiner

UNITED STATES PATENTS

| | | | |
|---|---|---|---|
| 2,375,506 | 12/41 | Turck | 252—474 X |
| 2,750,261 | 6/56 | Ipatieff et al. | 252—474 X |
| 2,892,801 | 6/59 | Sargent | 252—474 |
| 2,967,893 | 1/61 | Hort et al. | 252—474 X |

MAURICE A. BRINDISI, *Primary Examiner.*

JULIUS GREENWALD, *Examiner.*